UNITED STATES PATENT OFFICE.

JOHN W. MEADER, OF INDIANAPOLIS, INDIANA, ASSIGNOR TO THE ELI LILLY AND COMPANY, OF INDIANAPOLIS, INDIANA, A CORPORATION OF INDIANA.

CEPHAELIN BUTYL ETHER AND PROCESS OF PRODUCING THE SAME.

1,219,571.

Specification of Letters Patent.   Patented Mar. 20, 1917.

No Drawing.   Application filed July 17, 1915.   Serial No. 40,483.

*To all whom it may concern:*

Be it known that I, JOHN W. MEADER, a citizen of the United States, residing at Indianapolis, Marion county, and State of Indiana, have invented and discovered certain new and useful Improvements in Cephaelin Butyl Ether and Processes of Producing the Same, of which the following is a specification.

The invention relates to the previously unknown cephaelin butyl ethers, to which may be given the formula $C_{28}H_{37}O_3N_2OC_4H_9$, in which the hydrogen of the hydroxyl group of cephaelin has been replaced by a butyl group.

This compound is a valuable medicinal product, especially in the form of a salt. Its uses are substantially the same as those of emetin and the doses thereof may be somewhat larger than those used in the administration of emetin, since it is less toxic in effect than the latter.

The butyl ethers may be prepared by treating cephaelin with an alkali metal and a butyl haloid and isolating the cephaelin butyl ether by suitable methods. To prepare the isobutyl ether of these compounds the process in detail may be carried out as follows:—

46.6 grams of cephaelin and 4.6 grams of sodium are dissolved in about 400 cubic centimeters of absolute alcohol, about 17 grams of isobutyl bromid added, and the solution boiled under a reflux condenser for at least two hours. Cephaelin isobutyl ether which now exists in solution is isolated by recovering the alcohol, dissolving in dilute hydrochloric acid, making ammoniacal and extracting with ether. The ether solution of cephaelin isobutyl ether and unchanged cephaelin is extracted with an excess of dilute caustic soda solution to remove the cephaelin and evaporating to dryness on a water bath. The compound may be further purified by dissolving in an acid, crystallizing as a salt, dissolving in water, making ammoniacal, extracting with ether, recovering the ether and drying in vacuum.

Other butyl ethers are prepared by substituting other butyl haloids in the above process.

In the above process, potassium may be substituted for sodium and isobutyl iodid for isobutyl bromid. The absolute alcohol may be replaced by any other suitable solvent, for instance amyl alcohol.

The term "butyl compound" used herein is intended to cover both normal butyl and isobutyl compounds.

Cephaelin isobutyl ether is a varnish like substance easily soluble in alcohol, ether, and chloroform. It is dissolved in acids to form salts. The hydrobromid, formed according to known principles by the addition of hydrobromic acid to the base, crystallizes in white needles. The hydrochlorid, forming, according to known principles, by the addition of hydrochloric acid to the base, is also crystalline. The salt is the preferred form of the product owing to its capacity for oral administration.

What I claim is:

1. A butyl ether of cephaelin.
2. The isobutyl ether of cephaelin.
3. A monobutyl derivative of cephaelin.
4. A butyl compound of cephaelin containing essentially the atomic aggroupment $C_{28}H_{37}O_3N_2OC_4H_9$.
5. The process of producing a butyl ether of cephaelin comprising adding to cephaelin an alkali metal, a butyl haloid and a solvent.
6. The process of producing a butyl ether of cephaelin which comprises treating cephaelin with an alkali metal alcoholate and a butyl haloid.

In witness whereof, I have hereunto set my hand and seal at Indianapolis, Indiana, this 15th day of July, A. D. nineteen hundred and fifteen.

JOHN W. MEADER. [L. S.]

Witnesses:
E. W. BRADFORD,
A. C. RICE.